United States Patent
Leyser et al.

(10) Patent No.: US 7,389,953 B2
(45) Date of Patent: Jun. 24, 2008

(54) SPRAY HEAD FOR A GRANULATING SYSTEM

(75) Inventors: Patrick Leyser, Mondercange (LU); Christian Cortina, Mondercange (LU); Guy Kerschenmeyer, Kleinbettingen (LU)

(73) Assignee: Paul Wurth S.A., Luxembourg (LU)

( * ) Notice: Subject to any disclaimer, the term of this patent is extended or adjusted under 35 U.S.C. 154(b) by 349 days.

(21) Appl. No.: 10/536,525

(22) PCT Filed: Nov. 20, 2003

(86) PCT No.: PCT/EP03/50855

§ 371 (c)(1), (2), (4) Date: May 25, 2005

(87) PCT Pub. No.: WO2004/048617

PCT Pub. Date: Jun. 10, 2004

(65) Prior Publication Data

US 2006/0060682 A1   Mar. 23, 2006

(30) Foreign Application Priority Data

Nov. 25, 2002   (EP) ................... 02026157

(51) Int. Cl.
  *B05B 1/00* (2006.01)
  *B05B 1/02* (2006.01)
  *B05B 1/14* (2006.01)
  *B05B 1/36* (2006.01)
  *C03B 5/23* (2006.01)

(52) U.S. Cl. .................. 239/597; 239/437; 65/141

(58) Field of Classification Search ............ 239/437, 239/16, 17, 193, 302, 379, 436, 451, 455, 239/537, 538, 548, 568, 579, 581.1, 583, 239/589, 592, 597–599, 601; 65/141, 19; 241/38, 41
See application file for complete search history.

(56) References Cited

U.S. PATENT DOCUMENTS

| | | | | |
|---|---|---|---|---|
| 3,594,142 A | * | 7/1971 | Margesson et al. | 65/19 |
| 3,630,453 A | * | 12/1971 | Lane et al. | 239/437 |
| 3,878,991 A | * | 4/1975 | Sabadics et al. | 239/456 |
| 4,494,971 A | | 1/1985 | Monteyne et al. | |

(Continued)

FOREIGN PATENT DOCUMENTS

DE   40 32 518 C1   1/1992

*Primary Examiner*—Darren W Gorman
(74) *Attorney, Agent, or Firm*—McCormick, Paulding & Huber LLP

(57) ABSTRACT

A spraying head for a granulating installation includes a slotted nozzle in which a nozzle channel having an oblong cross-section of flow is limited downwards by a floor surface, upwards by a top surface and laterally by a side face on each side. An oblong flow control body in the nozzle channel extends axially between the two side faces to limit the height of a nozzle slot. The control body is pivoted about a longitudinal axis to adjust the height of the nozzle slot. The control body is a cylindrical body having an oval cross-section and a central axis which is approximately centrically disposed between the floor surface and the top surface and pivoted about its central axis, such that underneath as well as below the control body a nozzle slot is formed, the height of which can be adjusted by pivoting the control body about its central axis.

10 Claims, 5 Drawing Sheets

U.S. PATENT DOCUMENTS 5,388,285 A * 2/1995 Belniak .......................... 4/507
5,441,205 A * 8/1995 Kanazumi et al. ............. 241/41
6,000,242 A * 12/1999 George et al. .................. 65/19
6,360,973 B1 * 3/2002 Stilli .......................... 239/590

* cited by examiner

SPRAY HEAD FOR A GRANULATING SYSTEM

CROSS-REFERENCE TO RELATED APPLICATIONS

This application is entitled to the benefit of and incorporates by reference in their entireties essential subject matter disclosed in International Application No. PCT/EP03/50855 filed on Nov. 20, 2003 and European Patent Application No. EP 02 026 157.4 filed on Nov. 25, 2002.

FIELD OF INVENTION

The present invention relates to a spraying head for a granulating installation.

BACKGROUND OF THE INVENTION

During the granulation of blast furnace slag, cooling water is sprayed onto a flow of liquid slag by means of a spraying head, while this slag flow is falling down from a slag channel into a granulating basin. The liquid slag is quenched in the process, such that it solidifies and forms granulates.

For granulating one ton of blast furnace slag, between 4 and 12 $m^3$ of granulating water is required. Consequently, with large blast furnaces, the granulating water throughput in a spraying head is between 1000 $m^3$/h and 4000 $m^3$/h. For the granulate quality, apart from the granulating water quantity, among others also the impulse and shape of the water jets impacting on the liquid slag flow are decisive. These parameters are largely determined by the spraying head.

The slag throughput is not constant. In order to ensure an economical granulation and a constant granulate quality, the granulating water quantity is to be adapted to the slag throughput, the pressure remaining constant.

In order to achieve this aim, the DE 4032518 C1 proposes a spraying head with a field of hole type nozzles and a controllable slotted nozzle. The latter comprises two flap wings to be pivoted in opposite directions and forming a nozzle slot the height of which can be adjusted. A longitudinal edge of each flap wing has an undulating design and is rotatably fitted into a cylindrical bearing cavity which extends in the floor surface or the top surface, respectively, of a rectangular nozzle channel across the flow direction of the water. The other longitudinal edge of the flap wing forms the lower or upper lip, respectively, of the nozzle slot in this nozzle channel. By pivoting the two eccentrically mounted flap wings into opposite directions, the distance of the two lips can be changed, i.e. the height of the nozzle slot is reduced or increased. The two flap wings are connected outside the nozzle channel with a counter rotating gear which is driven by an electromotor.

The spraying head described in the DE 4032518 C1, however, has a lot of disadvantages. For example, the counter rotating gear and the electric drive have to be relatively strong as the water flow exerts considerable moments on the two flap wings. Furthermore, the wear resistance of the introduced slotted nozzle leaves something to be desired. In many granulating installations, the granulating water in fact carries large amounts of slag sand as it is conducted in a closed cycle. The abrasion force of such a water-sand mixture is well-known to the person skilled in the art. In the slotted nozzle of the DE 4032518 C1, in particular the two lips of the nozzle slot are subjected to an increased abrasion and wear out relatively quickly. This wear results in a relatively inexact characteristic of the control system of the slotted nozzle. Moreover, fine slag sand can penetrate into the bearing cavities of the flap wings which could possibly block the flap wings.

OBJECTS AND SUMMARY OF THE INVENTION

It is consequently the object of the present invention to provide a spraying head for a granulating installation, the spraying head having a controllable slotted nozzle which can be easily operated, requires only little maintenance and is moreover characterized by a stable characteristic of the control system.

Characterization of the Invention

A spraying head according to the invention comprises at least one controllable slotted nozzle in which the control body is a cylindrical body having an oval cross-section and a central axis. This control body is disposed approximately centrically between a floor and a top surface of the nozzle channel and can be pivoted about its central axis therein, such that underneath as well as above the control body a nozzle slot is formed, the height of which can be adjusted by simply pivoting the control body about its central axis. A controllable slotted nozzle of this construction only requires little maintenance even at very severe conditions (such as abrasive sand in the granulating water) and nevertheless ensures an excellent characteristic of the control system over a very long time. In this connection, it should be particularly noted that the oval-cylindrical control body does not have any weak points where the sand contained in the granulating water leads to a particularly fast erosion. Moreover, the flow around the oval-cylindrical control body is relatively laminar, so that the abrasion force of the slag sand is not reinforced by local swirls. Consequently, the oval-cylindrical control body can be applied for a very long time even in case of severe sand charges of the granulating water without the characteristic of the control system of the slotted nozzle essentially aggravating. Due to the central arrangement of the control body in the nozzle channel, moreover no fine sand can deposit in grooves or gaps and impair the operativeness of the slotted nozzle. It should be furthermore noted that the water flow only exerts a small moment on the control body pivotable about its central axis. For determining an angular position of the control body, consequently only small moments of force and thus weak drives are required.

In order to ensure a good characteristic of the control system and a low wear, the ratio of the small and the large axis of the oval cross-section of the control body should be preferably between 0.50 and 0.95.

The height of the rectangular cross-section of the nozzle channel should preferably be a few millimeters larger than the large axis of the oval cross-section. This ensures, for example, that in case of deformations of the nozzle channel and/or the control body, the control body does not block in a closed position.

At each of its two ends, the control body preferably comprises a bearing pin which laterally projects from the nozzle channel and is rotatably mounted outside the nozzle channel. A simple crank gear makes it possible to convert the lift of a lifting drive into a pivoting movement of the control body about its central axis. As only very small controlling torques are necessary, the lifting drive can advantageously be a relatively weak electric linear drive by which the angular position of the control body can be determined in a particularly simple manner.

In an advantageous embodiment, the control body comprises at least at one end a circular cylindrical sealing flange which is inserted in a circular hole in a side wall of the slotted nozzle and sealed therein by means of an O-ring. This circular hole should be large enough for permitting an axial insertion and withdrawal of the control body through this hole into the nozzle channel, so that the control body can be exchanged relatively easily.

The surface of the control body as well as the floor surface and the top surface of the nozzle channel are preferably plasma coated which even further improves their wear resistance. Due to the simple convex surface of the control body, such a surface coating of the control body is particularly permanent.

A spraying head according to the invention can furthermore comprise a water supply box in the front side of which the slotted nozzle is arranged, and wherein additionally a field of hole type nozzles can be arranged in the front side above and/or underneath the slotted nozzle.

If the spraying head is supplied with granulating water by a pumping set, it advantageously comprises a control device for the granulating water pressure in which the slotted nozzle is integrated as an actuator. If the spraying head, however, is supplied with granulating water by a distributing reservoir, it advantageously comprises a control device for the granulating water throughput, in which the slotted nozzle is integrated as an actuator.

It should be noted that a spraying head according to the invention can be applied in a particularly advantageous manner in granulating installations having large water throughputs, such as granulating installations for blast furnace slag.

DESCRIPTION OF THE DRAWINGS

In the following, now a preferred aspect of the invention as an embodiment of the invention is described with reference to the accompanying figures, wherein.

DESCRIPTION OF THE PREFERRED EMBODIMENTS

The spraying head 10 shown in the figures is intended for a granulating installation for blast furnace slag. Its function is to spray cooling water onto a flow of liquid slag while this flow e.g. is falling down from a slag channel into a granulating basin.

Figure 2:
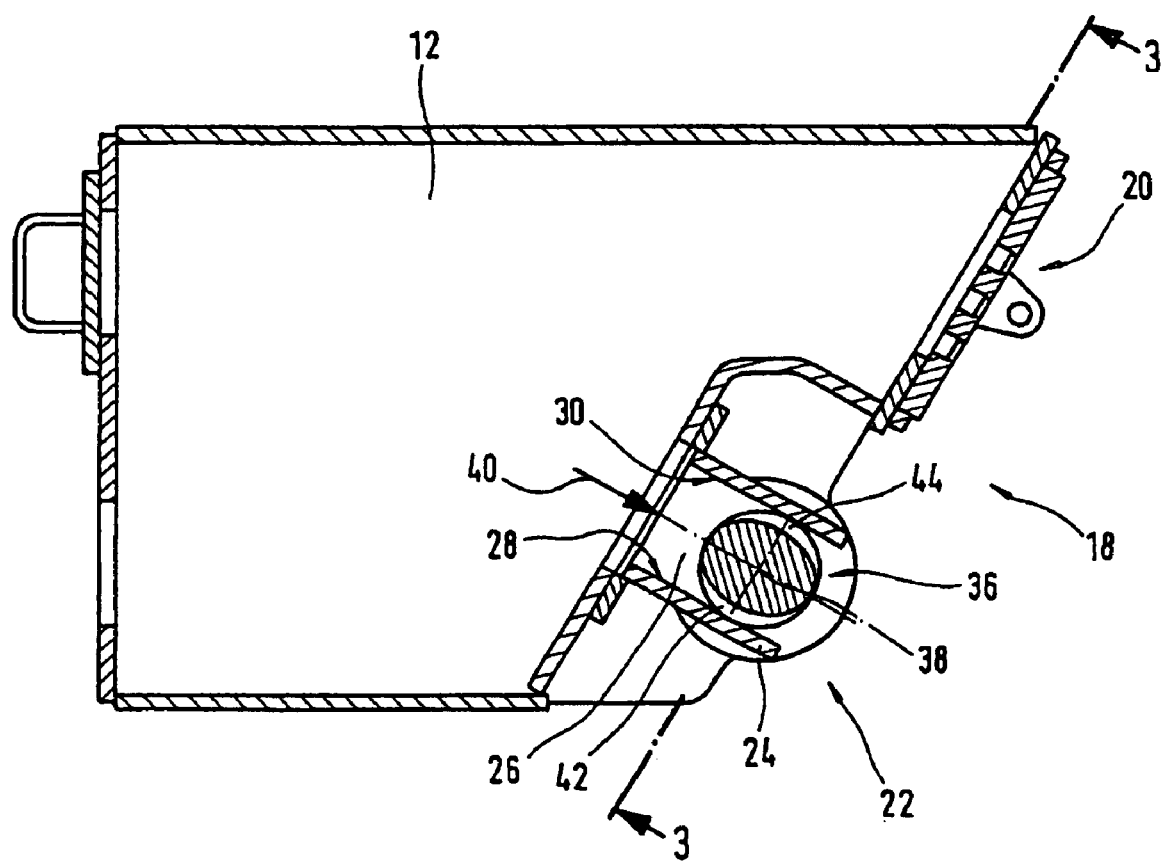
FIG. 2 shows a cross-section through the spraying head of FIG. 1, where the position of the cutting planes in FIG. 3 is indicated by line 2-2.

The shown spraying head 10 comprises a water supply box 12 with a lateral granulating water supply 14 and a lateral support piece 16. In FIG. 2, the arrow 18 points to the front side of the water supply box 12 from which the granulating water is exiting. This is done, on the one hand, via a field of hole type nozzles 20 in the upper half of the front side 18 and on the other hand via a slotted nozzle 22 in the lower half of the front side.

The slotted nozzle 22 comprises a socket piece 24 in which a nozzle channel 26 having a rectangular flow cross-section is limited downwards by a floor surface 28, upwards by a top surface 30 and laterally by two side faces 32, 34. All these surfaces 28, 30, 32, 34 are plasma coated in order to offer a better protection against the abrasive effect of slag sand. In this connection, it should be also noted that the socket piece 24 is designed as an exchangeable part and is flanged onto the water supply box 12.

The slotted nozzle 22 further comprises a cylindrical flow control body 36 extending in the nozzle channel 26 centrically between the floor surface 28 and the top surface 30 via the whole width of the nozzle channel 26. One can take from FIG. 2 that the control body 36 has an elliptical cross-section. The elliptical-cylindrical control body 36 can be pivoted about its central axis 38.

Figure 1:
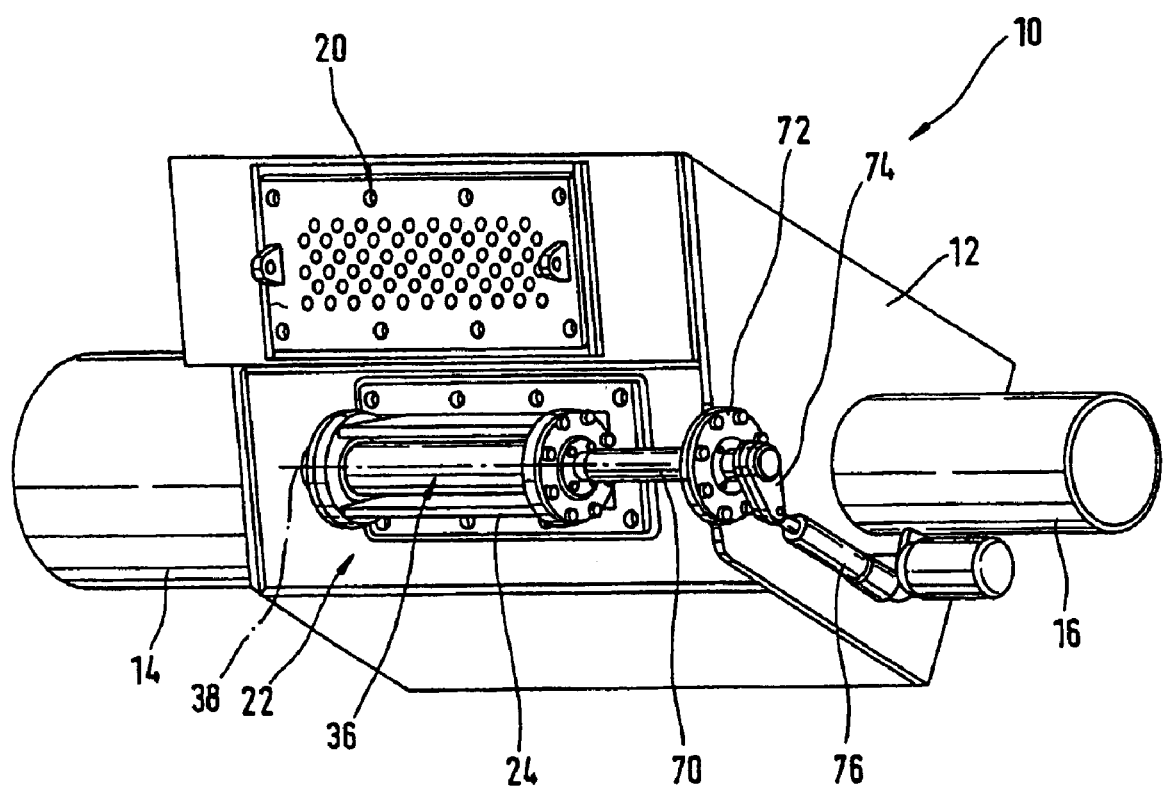
FIG. 1 shows a three-dimensional view of a spraying head according to the invention.

In FIG. 1, the plane containing the central axis 38 and the small elliptical axis is perpendicular to the flow direction 40 of the water. In this position of the control body 36, the flow cross-section of the nozzle channel 26 is least narrowed by the control body 36. A lower nozzle slot 42 is formed between the control body 36 and the floor surface 28 and an upper nozzle slot 44 is formed between the control body 36 and the top surface 30. The water flows through these two nozzle slots 42, 44 out of the socket piece 24 in two flat jets.

If the control body 36 is pivoted from the position shown in FIG. 1 about its central axis 38, the height of the lower as well as of the upper nozzle slots 42, 44, is reduced (see FIG. 2). In other words, the flow cross-section of the nozzle channel 26 is reduced in the area of the control body 36. The flow cross-section is at a minimum when the plane containing the central axis 38 and the large elliptical axis is perpendicular to the flow direction 40 of the water, i.e. when the control body 36 is pivoted by 90° from the position shown in FIG. 1 about its central axis 38. As the large elliptical axis is smaller by some millimeters than the height H of the nozzle channel 26, in this position of the control body 36, too, the two nozzle slots 42, 44, are still slightly opened. This makes the spraying nozzle 22 relatively insensitive to deformations of the socket piece 24, which can be caused, for example, by temperature influences and/or mechanical influences. It is left to be noted that the surface of the control body 36, too, is plasma coated.

Figure 3:
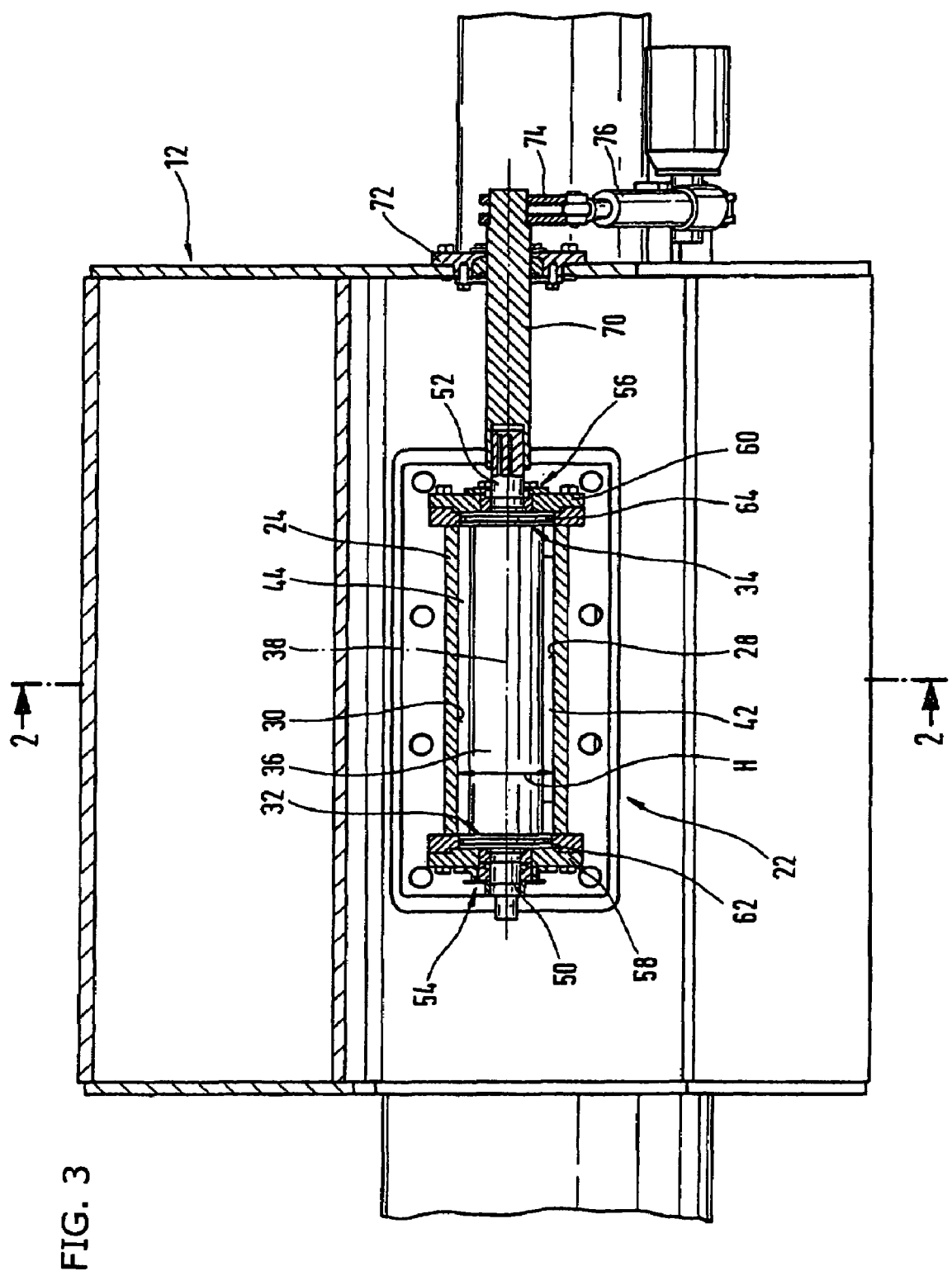
FIG. 3 shows a section through the spraying head of FIG. 1, where the position of the cutting planes in FIG. 2 is indicated by line 3-3.

One can take from FIG. 3 that the control body 36 comprises a bearing pin 50 and 52, respectively, at each of its two ends, which laterally project from the nozzle channel 26 and are there rotatably mounted in a bearing 54 and 56, respectively. The two bearings 54, 56 are advantageously arranged in attachment flanges 58, 60 which are screwed upon the side walls of the socket piece 24 from the outside.

At each of its two ends, the control body 36 additionally comprises a circular cylindrical sealing flange 62, 64 which are inserted in a circular hole in a side wall of the socket piece 26 and sealed therein by means of an O-ring. It is to be noted that the diameter of these two circular holes in the side wall of the socket piece 24 is larger than the large elliptical axis of the control body 36, so that, after having loosened the two attachment flanges 58, 60, one can withdraw the control body 36 from the nozzle channel 26 through these holes and reinstall them again.

Reference numeral 70 in FIG. 3 shows an extension shaft placed upon the bearing pin 52 and stationarily connected thereto. This extension shaft 70 is rotatably mounted in a flange 72 at the outside of the water supply box 12 and comprises a crank 74 at the other side of this flange. The latter is connected to an electric linear drive 76, such that the crank 74 converts a lift of this lifting drive into a pivoting movement of the control body about its axis of revolution. The angle amplitude should be at least 90° for the control potential of the control body 36 to be completely utilized. It should be noted that the drive 76 can be relatively weak, as due to the shape and the support of the control body 36, only small controlling torques are necessary for overcoming the water force. Instead of an electric linear drive 76, one could naturally also insert a pneumatic cylinder. It is moreover also possible to pivot the control body 36 by means of a rotary drive. As a rotary drive, for example, an electric stepper motor can be used, by means of which, as in the linear drive 76, a certain angular position of the control body can be exactly adjusted.

Furthermore, it should be emphasized that the control body 36 with the elliptical cross-section only causes little turbulences in the water. This does not only have a positive effect on the overall pressure loss of the granulating water in the spraying head, but the abrasive effect of the slag sand on the surfaces about which the water is flowing is also essentially reduced.

Figure 4:
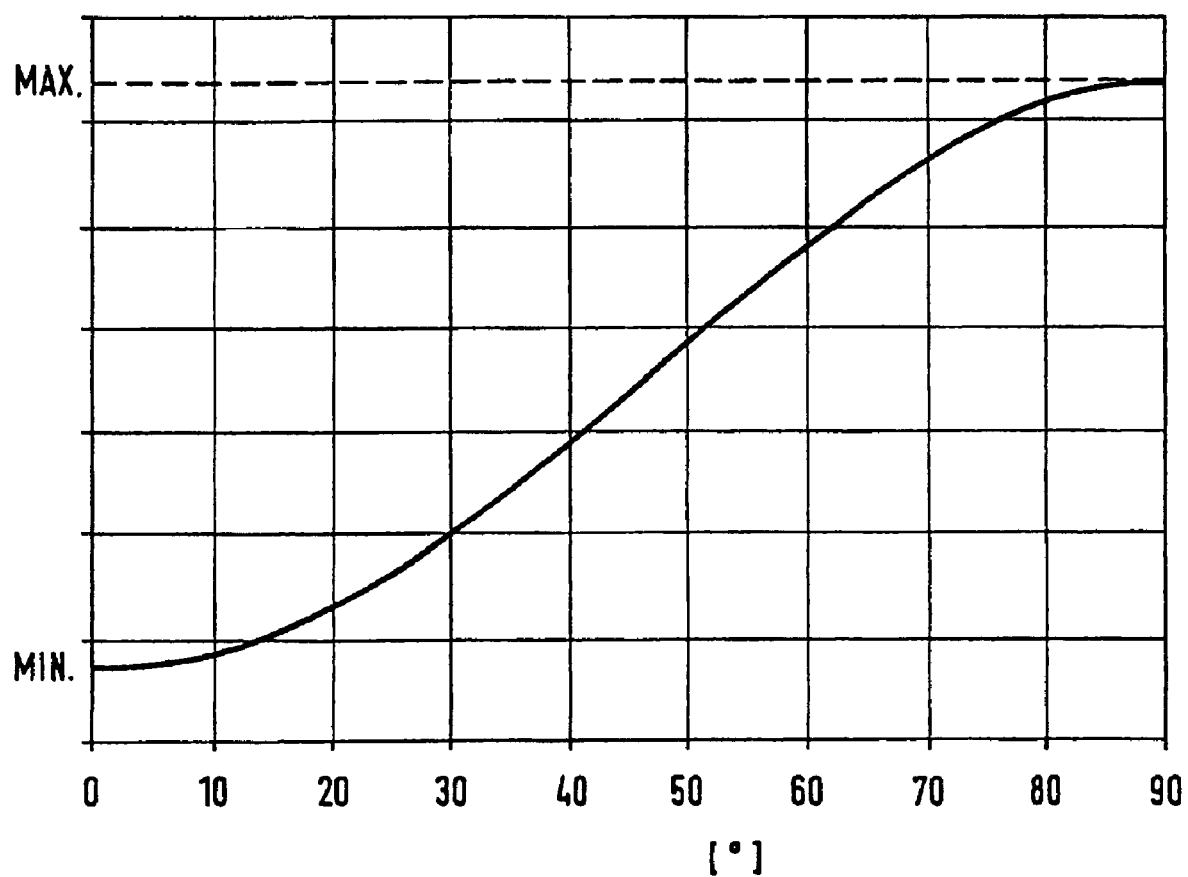
FIG. 4 shows a diagram illustrating the controlling action of a slotted nozzle in a spraying head according to the invention.

The diagram in FIG. 4 shows the flow rate of the slotted nozzle 22 in function of the control angle of the control body 36. A control angle of 0° means that the plane containing the central axis 38 and the large elliptical axis is perpendicular to the flow direction 40 of the water. A control angle of 90° means that the plane containing the central axis 38 and the small elliptical axis is perpendicular to the flow direction 40 of the water. The control body 36 for which the diagram was established comprises an elliptical cross-section for which the ratio of the small and the large axis is approximately 0.76. This axis ratio determines the characteristic of the control system of the slotted nozzle 22. It should preferably be between 0.50 and 0.95. One can furthermore take from the diagram of FIG. 4 that between 20° and 70°, the flow rate increases approximately proportionally to the control angle.

Figure 5:
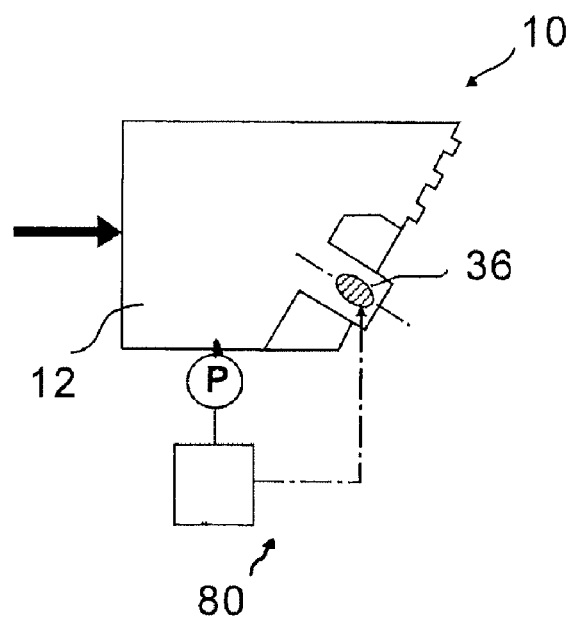
FIG. 5 is a schematic diagram of a first control system for the spraying head of FIG. 1.

If the spraying head 10 is directly supplied with granulating water by a pumping set, it preferably comprises a control system 80 controlling the angular position of the control body 36 in function of a measured pressure in the water supply box 12 (See FIG. 5). With such a control system 80, the pressure in the water supply box 12 can be maintained e.g. constant. The water throughput in the spraying head 10 is then determined by a slower flow rate control of the pumping set.

Figure 6:
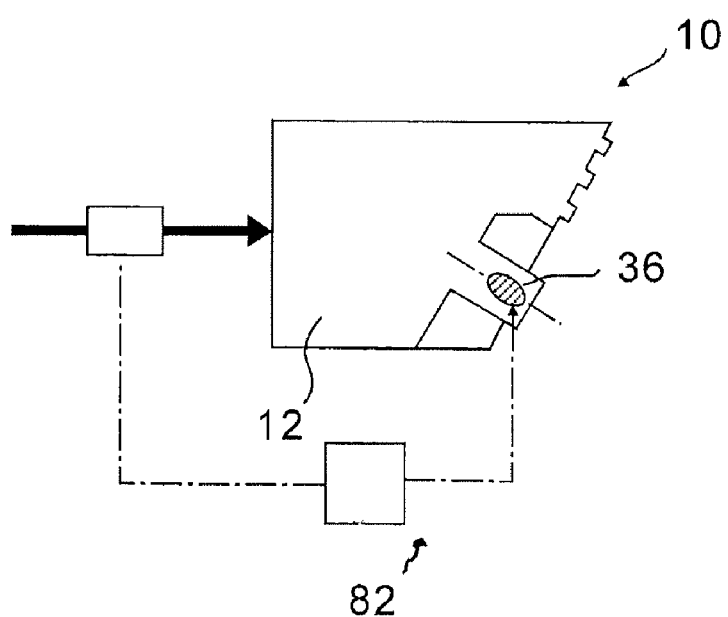
FIG. 6 is a schematic diagram of a second control system for the spraying head of FIG. 1.

If the spraying head 10 is supplied with a constant water pressure, e.g. from a distributing reservoir, it advantageously comprises a control system 82 for the granulating water throughput, into which the slotted nozzle 22 is integrated as a control valve (see FIG. 6).

The invention claimed is:

1. Spraying head for a granulating installation, comprising a slotted nozzle, in which a nozzle channel having an oblong cross-section of flow is limited downwards by a floor surface, upwards by a top surface and laterally by a side face each, an oblong flow control body in said nozzle channel extending axially between said two side faces to limit the height of a nozzle slot, and said control body being pivoted about a longitudinal axis to adjust the height of this nozzle slot; wherein
said control body is a cylindrical body having an oval cross-section and a central axis, which is approximately centrically disposed between said floor surface and said top surface and pivoted about its central axis, such that underneath as well as above said control body a nozzle slot is formed, the height of which can be adjusted by pivoting said control body about its central axis.

2. Spraying head according to claim 1, wherein:
said oval cross-section comprises a small and a large axis and the ratio of the small and the large axis is between 0.50 and 0.95.

3. Spraying head according to claim 2, wherein:
said nozzle channel has a rectangular cross-section having a height larger by a few millimeters than said large axis of said oval cross-section, such that said two nozzle slots always remain open.

4. Spraying head according to claim 1, wherein:
said control body comprises a bearing pin at each of its two ends, said bearing pin laterally projecting from said nozzle channel and being rotatably mounted outside said nozzle channel.

5. Spraying head according to claim 4, comprising:
a crank stationarily connected to one of said two bearing pins; and
a lifting drive connected to said crank such that a lift of said lifting drive is converted into a pivoting movement of said control body about its central axis.

6. Spraying head according to claim 4, wherein:
said control body comprises at least at one end a circular cylindrical sealing flange inserted into a circular hole in a side wall of the slotted nozzle and sealed herein by means of an O-ring, and
said circular hole is large enough for axially inserting and retracting said control body through said hole into said nozzle channel.

7. Spraying head according to claim 1, wherein:
a surface of said control body as well as said floor surface and said top surface of said nozzle channel are plasma coated.

8. The spraying head according to claim 1, comprising a water supply box with a front side in which said slotted nozzle is arranged; and
a field of hole type nozzles arranged in said front side above said slotted nozzle.

9. The spraying head according to claim 1, comprising a control system for controlling granulating water pressure in said spraying head, in which said slotted nozzle with said control body is incorporated as a control valve.

10. The spraying head according to claim 1, comprising a control system for controlling granulating water flow rate in said spraying head, in which said slotted nozzle with said control body is incorporated as a control valve.

* * * * *